United States Patent
Yun et al.

(10) Patent No.: US 11,734,792 B2
(45) Date of Patent: Aug. 22, 2023

(54) METHOD AND APPARATUS FOR VIRTUAL VIEWPOINT IMAGE SYNTHESIS BY MIXING WARPED IMAGE

(71) Applicant: ELECTRONICS AND TELECOMMUNICATIONS RESEARCH INSTITUTE, Daejeon (KR)

(72) Inventors: Joung Il Yun, Daejeon (KR); Sang Woon Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 91 days.

(21) Appl. No.: 17/350,904

(22) Filed: Jun. 17, 2021

(65) Prior Publication Data
US 2022/0005152 A1   Jan. 6, 2022

(30) Foreign Application Priority Data

Jun. 17, 2020 (KR) .................. 10-2020-0073755
Jun. 10, 2021 (KR) .................. 10-2021-0075358

(51) Int. Cl.
*G06T 3/00* (2006.01)
*G06T 3/40* (2006.01)
(Continued)

(52) U.S. Cl.
CPC ......... *G06T 3/0093* (2013.01); *G06T 3/4007* (2013.01); *G06T 3/4038* (2013.01);
(Continued)

(58) Field of Classification Search
CPC ............ G06T 3/0093; G06T 15/205; G06T 7/50–596; G06T 2207/10028;
(Continued)

(56) References Cited

U.S. PATENT DOCUMENTS

2010/0026712 A1* 2/2010 Aliprandi ............ G06T 15/20
                                                           345/629
2012/0122062 A1   5/2012 Yang et al.
(Continued)

FOREIGN PATENT DOCUMENTS

CN     109712067 B  *  5/2021
KR    1020180019695 A    2/2018
(Continued)

OTHER PUBLICATIONS

Fachada, Sarah, et al. "Depth image based view synthesis with multiple reference views for virtual reality." 2018-3DTV-Conference: The True Vision-Capture, Transmission and Display of 3D Video (3DTV-CON). IEEE, 2018. (Year: 2018).*
(Continued)

*Primary Examiner* — Ian L Lemieux

(57) ABSTRACT

A video decoding method comprises warping different viewpoint images into a virtual viewpoint by using depth information of an input viewpoint; determining a first weight for the pixels based on quality and depth of pixels of the warped viewpoint images; determining a second weight for the pixels based on a location relation between the pixels of the warped viewpoint images and the virtual viewpoint; determining a blending weight for the pixels based on the first weight and the second weight; blending the warped viewpoint images according to the blending weight; and synthesizing an image of the virtual viewpoint based on the blended viewpoint images.

18 Claims, 6 Drawing Sheets

(51) Int. Cl.
  *G06T 5/50* (2006.01)
  *G06T 5/00* (2006.01)
  *G06T 15/20* (2011.01)

(52) U.S. Cl.
  CPC ............... *G06T 5/005* (2013.01); *G06T 5/50* (2013.01); *G06T 15/205* (2013.01)

(58) Field of Classification Search
  CPC ..... G06T 3/4007; G06T 3/4038; G06T 5/005; G06T 5/50
  See application file for complete search history.

(56) References Cited

U.S. PATENT DOCUMENTS

| | | |
|---|---|---|
| 2012/0141016 A1 | 6/2012 | Wildeboer |
| 2015/0317057 A1 | 11/2015 | Choi et al. |

FOREIGN PATENT DOCUMENTS

| | | |
|---|---|---|
| KR | 102000486 B1 | 7/2019 |
| KR | 102029680 B1 | 10/2019 |
| KR | 10-2020-0057612 A | 5/2020 |

OTHER PUBLICATIONS

Buehler, Chris, et al. "Unstructured lumigraph rendering." Proceedings of the 28th annual conference on Computer graphics and interactive techniques. 2001. (Year: 2001).*

Jung, Joël, and Patrick Boissonade. "VVS: Versatile View Synthesizer for 6-DoF Immersive Video." (2020). (Year: 2020).*

Chao-Hsuan et al., "A Triangular-Warping Based View Synthesis Scheme With Enhanced Artifact Reduction for FTV," 18th IEEE International Conference on Image Processing, 2011.

* cited by examiner

Warped image of each input viewpoint
image into virtual viewpoint location
(a)

Finally synthesized virtual viewpoint
image blended and inpainted
(b)

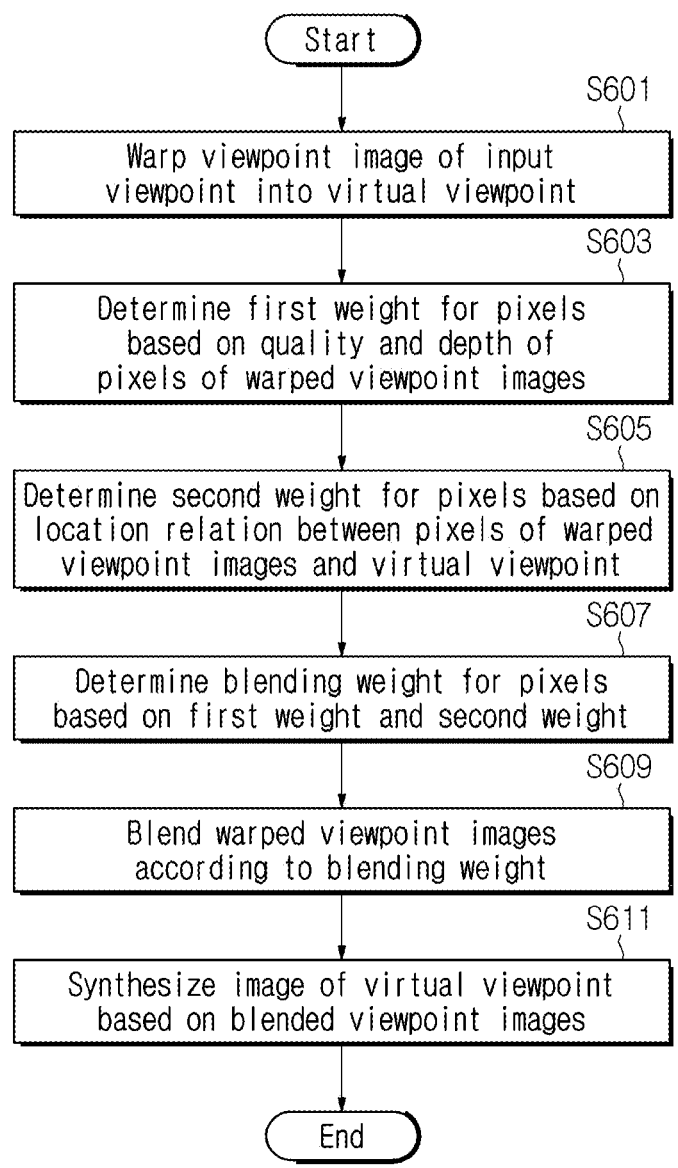

METHOD AND APPARATUS FOR VIRTUAL
VIEWPOINT IMAGE SYNTHESIS BY
MIXING WARPED IMAGE

CROSS REFERENCE TO RELATED APPLICATION

The present application claims priority to Korean Patent Application No. 10-2020-0073755 filed Jun. 17, 2020, and No. 10-2021-0075358 filed Jun. 10, 2021, the entire contents of which are incorporated herein for all purposes by this reference.

BACKGROUND OF THE INVENTION

Field of the Invention

The present disclosure relates to a method and apparatus for virtual viewpoint image synthesis by mixing a warped image. Particularly, the present disclosure relates to a method and apparatus for mixing a plurality of warped images and synthesizing a virtual viewpoint image based on a weight assigned to a pixel.

Description of the Related Art

Virtual viewpoint synthesis is a method for synthesizing an image of a virtual viewpoint camera that exists between input viewpoint cameras. Herein, in order to synthesize the virtual viewpoint image, a technique of warping an image based on depth information of a pixel is used.

As an input viewpoint image, which includes sufficient omni-directional spatial information obtained from various positions and directions, and accurate depth information are provided, a virtual viewpoint image synthesis device may perform synthesis of an intermediate viewpoint image between input viewpoints more accurately. Furthermore, the virtual viewpoint image synthesis device may synthesize a virtual viewpoint image that provides a natural parallax change according to 6 degrees of freedom (DoF) movements combining rotation and translation.

Herein, an efficient warping method is required to optimize the speed and quality of virtual viewpoint image synthesis.

SUMMARY

The present disclosure is directed to provide a method for synthesizing a virtual viewpoint image by interpolating a color of a pixel inside a triangle and generating a warped image.

Also, the present disclosure is directed to provide a method for synthesizing a virtual viewpoint image, of which the quality is enhanced based on a quality-based weight of a warped triangle and a ray-based weight that is set according to the relationship between an input viewpoint camera and a virtual viewpoint camera.

According to the present disclosure, provided is a method for synthesizing a virtual viewpoint image, the method comprising: warping different viewpoint images into a virtual viewpoint by using depth information of an input viewpoint; based on quality and depth of pixels of the warped viewpoint images, determining a first weight for the pixels; based on a location relation between the pixels of the warped viewpoint images and the virtual viewpoint, determining a second weight for the pixels; based on the first weight and the second weight, determining a blending weight for the pixels; blending the warped viewpoint images according to the blending weight; and based on the blended viewpoint images, synthesizing an image of the virtual viewpoint.

According to an embodiment, wherein the warping of the viewpoint images of the input viewpoint into the virtual viewpoint comprises warping a viewpoint image in a triangle unit that is defined by 3 pixels adjacent to a pixel of the viewpoint image.

According to an embodiment, wherein a quality value of a pixel of the warped images is inversely proportional to a length of a longest side of a triangle unit corresponding to the pixel of the viewpoint image.

According to an embodiment, wherein a depth value of a pixel of the warped images is determined by interpolating a depth value of 3 pixels of a triangle unit corresponding to the pixel of the viewpoint image.

According to an embodiment, wherein the second weight is determined based on an area of a region that is defined by a first point of a pixel in a three-dimensional space according to depth information of the pixel, a second point indicating a camera center of an input viewpoint, and a third point indicating a camera center of a virtual viewpoint.

According to an embodiment, wherein the second weight is determined to be inversely proportional to the area of the region.

According to an embodiment, wherein the second weight is determined to be inversely proportional to a product of a distance between the second point indicating the camera center of the input viewpoint and the third point indicating the camera center of the virtual viewpoint and the area of the region.

According to an embodiment, wherein the second weight is determined based on at least one of a rig structure of a camera and a feature of an image.

According to an embodiment, wherein, when different pixels of the warped viewpoint images have a same location, the blending of the viewpoint images comprises using a color value, which is weight-blended based on a blending weight of the different pixels, to blend the viewpoint images.

According to an embodiment, the method further comprising: inpainting a hole part of the synthesized image of the virtual viewpoint.

According to the present disclosure, provided is an apparatus for synthesizing a virtual viewpoint image, the apparatus comprising: a projector configured to warp different viewpoint images into a virtual viewpoint by using depth information of an input viewpoint; a blender configured to blend the warped viewpoint images according to a blending weight for pixels of the warped viewpoint images; and a synthesizer configured to synthesize an image of the virtual viewpoint based on the blended viewpoint images, wherein the blending weight is determined based on a first weight for pixels of the warped viewpoint images, which is determined based on quality and depth of the pixels, and a second weight for pixels of the warped viewpoint images, which is determined based on a location relation between the pixels and the virtual viewpoint.

According to an embodiment, wherein the projector is further configured to warp a viewpoint image in a triangle unit that is defined by 3 pixels adjacent to a pixel of the viewpoint image.

According to an embodiment, wherein a quality value of a pixel of the warped images is inversely proportional to a length of a longest side of a triangle unit corresponding to the pixel of the viewpoint image.

According to an embodiment, wherein a depth value of a pixel of the warped images is determined by interpolating a depth value of 3 pixels of a triangle unit corresponding to the pixel of the viewpoint image.

According to an embodiment, wherein the second weight is determined based on an area of a region that is defined by a first point of a pixel in a three-dimensional space according to depth information of the pixel, a second point indicating a camera center of an input viewpoint, and a third point indicating a camera center of a virtual viewpoint.

According to an embodiment, wherein the second weight is determined to be inversely proportional to the area of the region.

According to an embodiment, wherein the second weight is determined to be inversely proportional to a product of a distance between the second point indicating the camera center of the input viewpoint and the third point indicating the camera center of the virtual viewpoint and the area of the region.

According to an embodiment, wherein the second weight is determined based on at least one of a rig structure of a camera and a feature of an image.

According to an embodiment, wherein, when different pixels of the warped viewpoint images have a same location, the blender is further configured to use a color value, which is weight-blended based on a blending weight of the different pixels, to blend the viewpoint images.

According to the present disclosure, provided is a recording medium for storing a virtual viewpoint image synthesized by a virtual viewpoint image synthesis method, wherein the virtual viewpoint image synthesis method comprises: warping different viewpoint images into a virtual viewpoint by using depth information of an input viewpoint; based on quality and depth of pixels of the warped viewpoint images, determining a first weight for the pixels; based on a location relation between the pixels of the warped viewpoint images and the virtual viewpoint, determining a second weight for the pixels; based on the first weight and the second weight, determining a blending weight for the pixels; blending the warped viewpoint images according to the blending weight; and based on the blended viewpoint images, synthesizing an image of the virtual viewpoint.

According to the present disclosure, a method and apparatus for synthesizing a virtual viewpoint image based on a plurality of input images and depth information by using a triangle-based warping method may be provided.

Also, according to the present disclosure, a method and apparatus for synthesizing a virtual viewpoint image closer to reality may be provided by proposing a ray-based weight, which is suitable for mixing a plurality of warping images, and a weight model capable of adjusting a ratio and intensity of the ray-based weight.

Also, according to the present disclosure, a VR video service for providing a 6 degrees of freedom (DoF) viewpoint with enhanced immersion effect may be provided, which improves image synthesis quality to provide an omni-directional image in virtual reality (VR).

The technical problems solved by the present disclosure are not limited to the above technical problems and other technical problems which are not described herein will become apparent to those skilled in the art from the following description.

BRIEF DESCRIPTION OF THE DRAWINGS

FIG. 6 illustrates an image synthesis method based on a blending weight.

DETAILED DESCRIPTION

Figure 1:
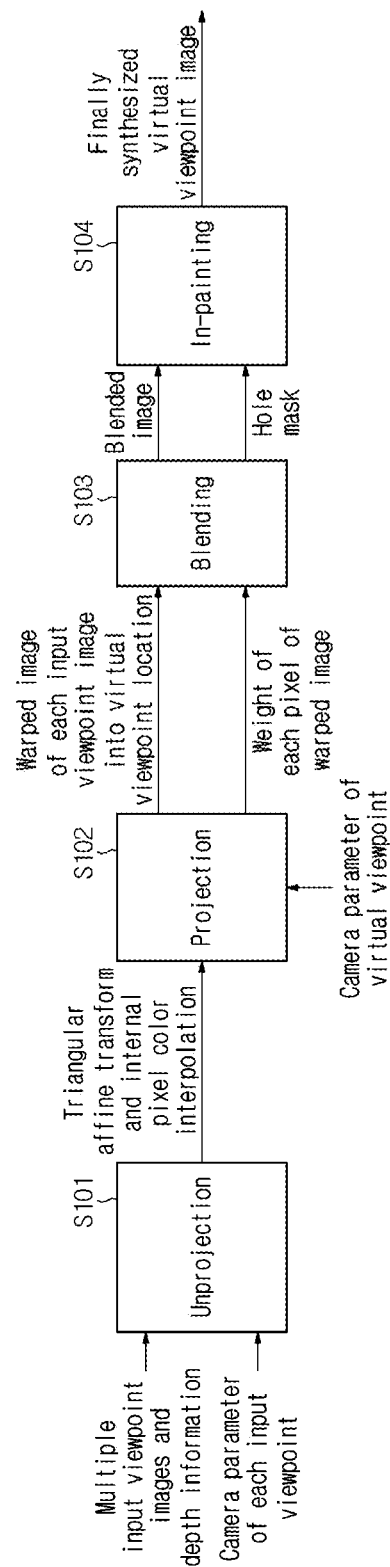
FIG. 1 is a view for explaining an embodiment of a virtual viewpoint synthesis method based on triangular warping.

Hereinafter, embodiments of the present invention will be described in detail with reference to the accompanying drawings, which will be easily implemented by those skilled in the art. However, the present invention may be embodied in many different forms and is not limited to the embodiments described herein.

In the detailed description of the preferred embodiments of the disclosure, however, detailed depictions of well known related functions and configurations may be omitted so as not to obscure the art of the present disclosure with superfluous detail. Also, the same or similar reference numerals are used throughout the different drawings to indicate similar functions or operations.

When an element is referred to as being "connected to" or "coupled with" another element, it can not only be directly connected or coupled to the other element but also it can be understood that intervening elements may be present. Also, when a specific element is referred to as being "included", elements other than the corresponding element are not excluded, but additional elements may be included in embodiments of the present invention or the scope of the present invention.

It will be understood that, although the terms including ordinal numbers such as "first", "second", etc. these terms are only used to distinguish one element from another and are not to limit the order and the priority of the elements. For example, a second element could be termed a first element without departing from the teachings of the present inventive concept, and similarly a first element could be also termed a second element.

The components as used herein may be independently shown to represent their respective distinct features, but this does not mean that each component should be configured as a separate hardware or software unit. In other words, the components are shown separately from each other for ease of description. At least two of the components may be combined to configure a single component, or each component may be split into a plurality of components to perform a function. Such combination or separation also belongs to the scope of the present invention without departing from the gist of the present invention.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure.

Furthermore, terms such as " . . . part", " . . . unit", and " . . . module" mean a unit which processes one or more functions or operations, and may be implemented by hardware, software, or a combination of hardware and software.

A process, by which one point in a three-dimensional space passes through a pinhole camera and is projected onto an image, may be explained by using three coordinate systems. The coordinate systems may be a world coordinate system for displaying a coordinate of a space in which a scene is present, a camera coordinate system for displaying a space inside a camera, and an image coordinate system for displaying a position of an image. Generally, a single world coordinate system is used in a multiview video system, and positions of cameras in the multiview video system may be indicated based on the world coordinate system.

In order to generate any virtual viewpoint image, a reference image should be moved to a virtual viewpoint space. For example, an object of a reference viewpoint image may be moved to a virtual viewpoint space by using a three-dimensional warping technique, which is one of depth image-based rendering methods. Herein, a reference viewpoint may be used in the same meaning as an input viewpoint.

In the present disclosure, "input viewpoint" may mean a viewpoint of a camera, which takes an image including an input image and depth information. In addition, "virtual viewpoint" or "a viewpoint moved from an input viewpoint" may mean a viewpoint of a virtual camera that takes a virtual image to be synthesized.

Hereinafter, embodiments of the present disclosure will be described with reference to the accompanying drawings.

Depending on whether a warping unit is a point (e.g., a pixel unit) or a plane (e.g., a triangle unit defined by 3 neighboring pixels), 2 main methods of synthesizing a virtual viewpoint image may be distinguished. Depending on a warping unit, there may be a difference in an image synthesis process.

When generating a warping image of a virtual viewpoint location by warping an input viewpoint image in a pixel unit, a virtual viewpoint image synthesis device may generate a depth image of a virtual viewpoint through forward warping. In addition, the virtual viewpoint image synthesis device may determine a pixel color of an image that is warped to a virtual viewpoint through backward warping.

Herein, because of an occlusion region, a common hole may occur to a virtual viewpoint image. Also, as a result of mapping pixels, by the virtual viewpoint image synthesis device, to integer indexes of an image coordinate system in a three-dimensional space, a small hole (e.g., a crack) may occur to a virtual viewpoint image.

In order to remove a common hole and/or small holes, the virtual viewpoint image synthesis device may use a median filter before performing backward warping. When objects overlap with each other or a virtual viewpoint image at a location having a large change of viewpoint is to be synthesized, the virtual viewpoint image synthesis device may fill a hole of a foreground object region with a depth value of a background region. Accordingly, a warped depth image may have a distortion (artifact) due to the median filter, and the quality of image synthesis may be degraded.

In order to prevent the quality degradation of a synthesized image caused by per-pixel warping of an input viewpoint image, a virtual viewpoint image synthesis device may warp a plane of a triangle unit, which is defined by 3 pixels adjacent to a pixel of the input viewpoint image. The plane of the triangle unit may be affine transformed according to depth difference of points and a viewpoint change to a virtual viewpoint and may be projected to the virtual viewpoint. Herein, colors of pixels inside the triangle plane are determined by color values of pixels which are interpolated according to projected locations of pixels and an area ratio of a triangle composed of projected pixels. A method of synthesizing, by a virtual viewpoint image synthesis device, a virtual viewpoint image based on triangular warping may be described as follows.

FIG. 1 is a view for explaining an embodiment of a virtual viewpoint image synthesis method based on triangular warping.

Referring to FIG. 1, in the step S101, an input viewpoint image may be unprojected to a world coordinate system in a three-dimensional space. Herein, a plurality of input viewpoint images, depth information of pixels of input viewpoint images, a projection method of input viewpoint images, and a camera parameter of an input viewpoint may be used.

In the step S102, according to a projection method of a virtual viewpoint image to be synthesized and a setting of a camera parameter, an input viewpoint image may be projected from the world coordinate system of the three-dimensional space to an image coordinate system of a virtual viewpoint camera. Herein, the input viewpoint image may be triangle-affine transformed. In addition, a pixel inside a triangle unit may be color-interpolated. As a projection result of the image coordinate system of the virtual viewpoint camera, a warped image may be generated.

Also, in the step S103, viewpoint images, which are warped to virtual viewpoint locations, may be weighted-average blended based on weights that are set for each pixel of the viewpoint images. The weighted-average blended viewpoint images are referred to as synthesized images.

In the step S104, holes left in a synthesized image may be filled with colors of neighboring pixels having high similarity. Accordingly, a final synthesized image may be generated.

The below describes a concrete embodiment of a virtual viewpoint image synthesis process that applies a virtual viewpoint image synthesis method based on the triangular warping illustrated in FIG. 1.

Figure 2:
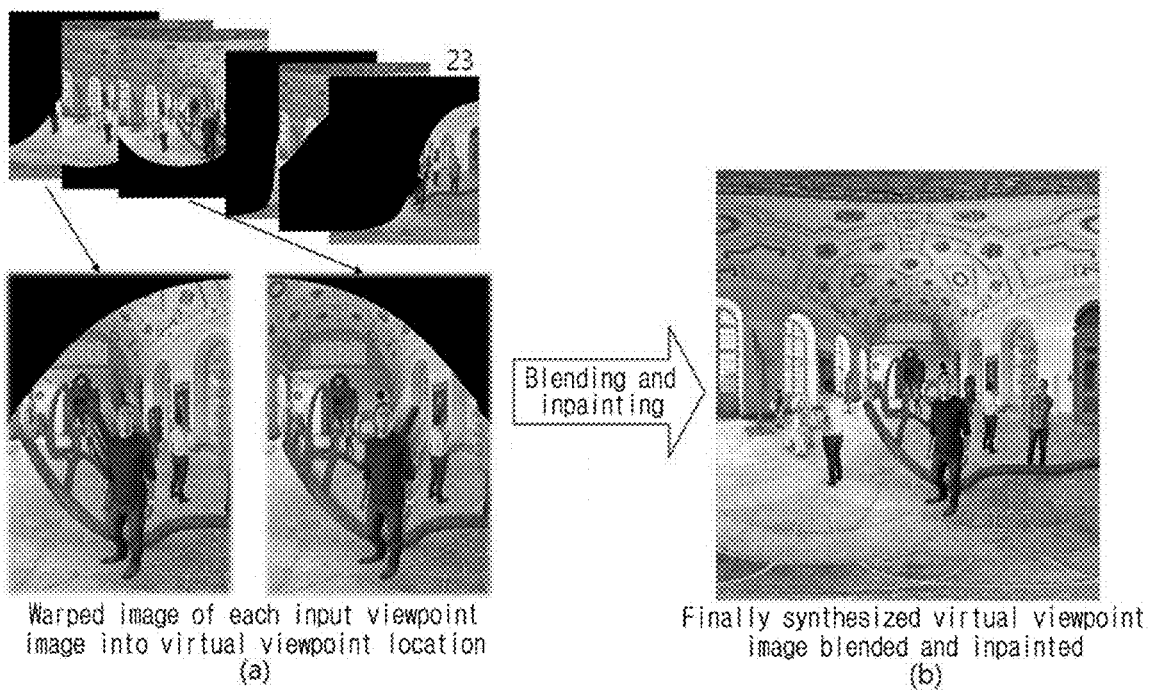
FIG. 2 is a view for explaining an embodiment of a virtual viewpoint image synthesis process based on triangular warping.

FIG. 2 is a view for explaining an embodiment of a virtual viewpoint image synthesis process based on triangular warping.

Referring to FIG. 2, in a triangle-based warping method, the shape of a triangle may be changed according to a depth difference of pixels and a viewpoint change. Especially, a patch, which is mapped to a part with a large depth difference like a boundary between objects, may be mapped in a form as stretched as a distance between neighboring pixels. According to a change of form in the mapped triangle, a weight of a pixel of the patch may be determined. In addition, a virtual viewpoint image synthesis device may perform weighted blending of pixels based on weights of the pixels. Thus, a distortion caused by image synthesis may be reduced.

According to an embodiment, a pixel of a patch, which is mapped in a stretched form because of being located in a boundary part, is blended by a relatively lower weight than a normally mapped pixel. Accordingly, the quality of a synthesized image may be different according to weight adjustment.

For example, (a) of FIG. 2 illustrates an embodiment in which each input viewpoint image is warped to a virtual viewpoint. Herein, according to a depth difference of pixel and a change of viewpoint, a triangular shape is warped to be stretched.

Also, (b) of FIG. 2 illustrates an embodiment of a virtual viewpoint image that is ultimately synthesized as the warping images of (a) of FIG. 2 are blended and inpainted. Referring to (b) of FIG. 2, the triangle so warped as to be stretched in (a) of FIG. 2 may be removed in the blending process. That is, a weight of warping images is determined according to a change in the form of a triangular unit plane. Furthermore, triangular planes are weight-blended according to the determined weight. Accordingly, when synthesizing a virtual viewpoint image, a distortion caused by image synthesis may be reduced.

In a process of synthesizing a virtual viewpoint image by a triangular warping method, a low weight is assigned to pixels of a triangle region that is much stretched as a result of warping. In addition, warped images may be synthesized by being weight-blended based on weights. Herein, a virtual viewpoint image synthesis device should process more pixels to synthesize a stretched triangle than to synthesize a normally warped triangle. Accordingly, an image synthesis speed may be lowered due to the synthesis of the stretched triangle. A pixel, to which a low weight is assigned though, may affect the quality of a synthesized image.

When synthesizing a virtual viewpoint image supporting a 6 DoF viewpoint change in which rotation and translation are combined, planes of multiple triangle units may be projected to a same location. In case planes of multiple triangle units are projected to a same location, a virtual viewpoint image synthesis device determines, according to Equation 1, a plane of a triangle unit to be used for synthesis based on pixel depth d and triangle_shape according to stretch of triangle units. According to Equation 1, when triangle_shape and d of a new triangle satisfy the condition, the virtual viewpoint image synthesis device replaces a color of a previously projected image by a color of a pixel inside a plane of a newly projected triangle unit and generates a warped image.

$$\frac{triangle\_shape_{new}}{d_{new}^{\alpha}} > \frac{triangle\_shape_{old}}{d_{old}^{\alpha}} \quad \text{[Equation 1]}$$

In Equation 1, triangle_shape indicates a quality that is quantitatively determined based on a plane shape of a projected triangle unit. According to an embodiment, triangle_shape may be inversely proportional to a length of the longest side in a plane of a projected triangle unit. Pixels inside the projected triangle have a same triangle_shape. Triangle_shape may have a value within a predetermined range. Alternatively, triangle_shape may be defined in variously modified methods and is not limited to what is described in the present disclosure.

d indicates a depth value of a pixel inside a projected triangle, which is determined as a result of interpolating a depth value of pixels for the apexes of the triangle. When a projection format of a synthesized image is a perspective projection, d indicates a vertical distance between a virtual viewpoint and a triangle. When a projection format of a synthesized image is equirectangular projection (ERP), d indicates a straight-line distance between a projection center and a triangle.

a indicates a parameter for adjusting the importance of triangle_shape and d. According to an embodiment, α may have a value around 3.

According to Equation 1, in case a color of a specific pixel location of a warped image should be determined among a plurality of candidate pixels, a virtual viewpoint image synthesis device select a pixel to be ultimately projected, which has a low depth value and a high quality value. In addition, the virtual viewpoint image synthesis device determines a color of a warped image based on the selected pixel. Accordingly, a pixel inside a plane of a triangle unit, which is warped to a surface of an object at a close distance from a virtual viewpoint, may be selected with a high probability. On the other hand, a triangle, which is warped in a stretched form unlike reality, may be selected with a low probability. Alternatively, a pixel inside a plane of a triangle unit, which is warped to a background part to be occluded and unseen so that it has a large depth value, may be selected with a low probability.

A virtual viewpoint image synthesis device, which blends warped images, determines a blending weight $w_{blending}$ of a pixel of a warped image by using a quality value of a plane of a triangle unit corresponding to the pixel and a depth value of the pixel. For example, the virtual viewpoint image synthesis device determines a blending weight of a pixel of a warped image by using Equation 2. Also, the virtual viewpoint image synthesis device performs weighted blending of per-pixel color values of an entire warped image based on the blending weight and generates a synthesized image.

$$w_{blending} = \left(\frac{triangle\_shape}{d}\right)^{\alpha} \quad \text{[Equation 2]}$$

According to the present disclosure, a blending weight $w_t$ (hereinafter, referred to as "triangle quality-based weight"), which uses the quality and pixel depth of a triangle unit to blend a plurality of warped images, may be a weight to which a weight $w_r$ (hereinafter, referred to as "ray-based weight") is applied, which reflects a location relation between a ray obtaining a pixel of an image from an input viewpoint camera and a virtual viewpoint. A blending weight, to which a ray-based weight is applied, may be expressed as in Equation 3.

$$w_{blending} = w_{tri} \cdot w_{ray} \quad \text{[Equation 3]}$$

Here, $w_{tri}$ is the same as $w_{blending}$ derived by Equation 2.

As a center point of a virtual viewpoint camera gets closer to a straight line connecting a center of an input viewpoint camera and a point in a space where a pixel is obtained, information of the pixel may get closer to information of a real space. Accordingly, in a blending process, a larger weight is assigned to a pixel of an input viewpoint closer to information of a real space, among pixels of a warped image of each input viewpoint, and a virtual viewpoint image more similar to reality is used for synthesis. That is, a ray-based weight has a larger value as a center point of a virtual viewpoint camera gets closer to a straight line connecting a center of an input viewpoint camera and a point in a space where a pixel is obtained.

Figure 3:
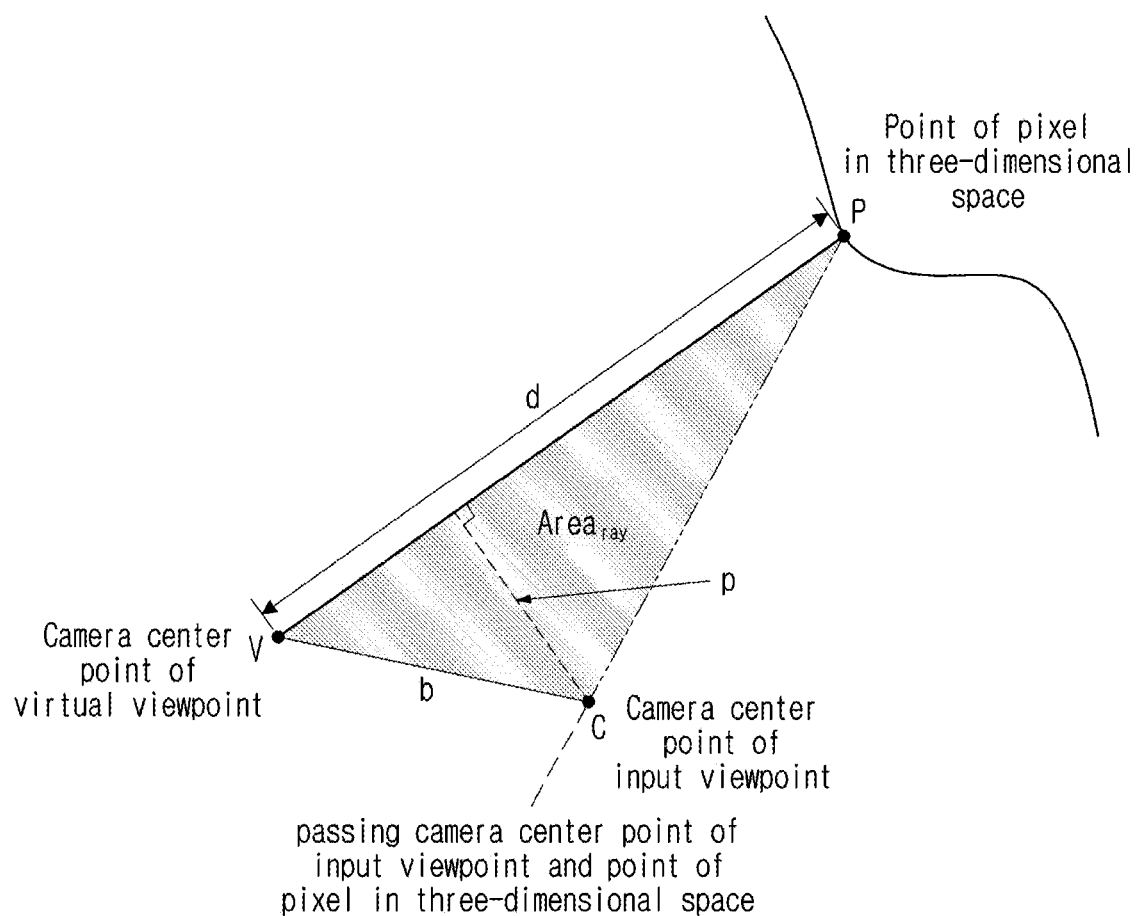
FIG. 3 illustrates an embodiment of a region for determining a ray-based weight.

FIG. 3 illustrates an embodiment of a region for determining a ray-based weight.

According to FIG. 3, a ray-based weight $w_{ray}$ of a warped pixel may be inversely proportional to an area of a region that is defined by 3 points, a point P of a pixel in a three-dimensional space according to depth information of the pixel, a point C indicating a camera center of an input viewpoint, and a point V indicating a camera center of a virtual viewpoint.

The region defined by the 3 points may be a triangle in shape. However, an actual area of a region defined by the 3 points may not be the same as an area of a triangle. The area of the region defined by the 3 points may be a proportional area reflecting a scale.

An area of a region defined by 3 points may be referred to as "an area of a region defined by a point of a pixel in a three-dimensional space and camera center points" or "an area of a region defined by the 3 points, P, C, and V". Alternatively, an area of a region defined by 3 points may be expressed by Area$_{ray}$.

Figure 4:
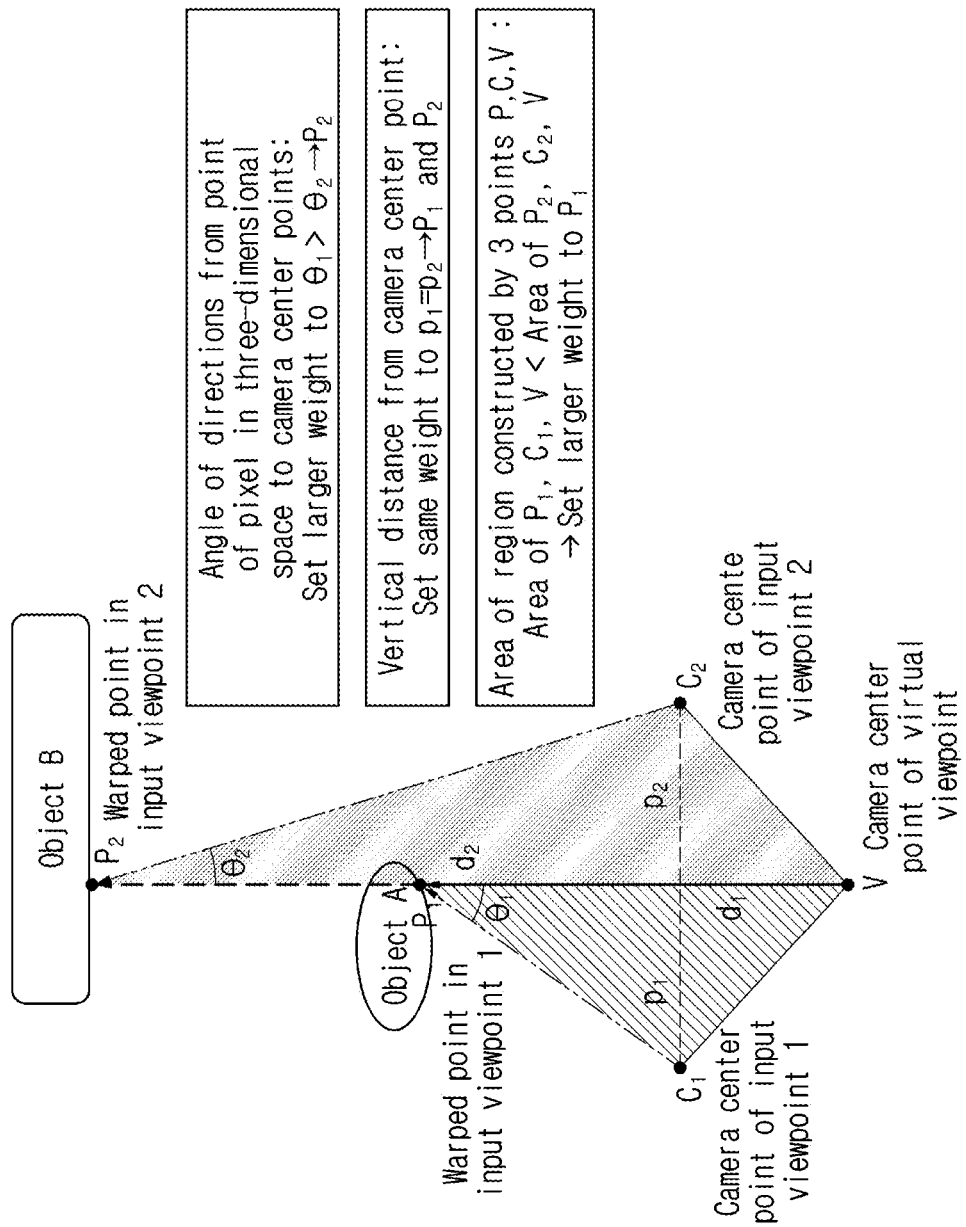
FIG. 4 is a view illustrating a feature of a ray-based weight.

FIG. 4 is a view illustrating a feature of a ray-based weight.

Referring to FIG. 4, embodiments of assigning a weight to a pixel are illustrated.

According to an embodiment, a weight of a pixel may be determined based on an angle between a direction from a point of a warped pixel in a three-dimensional space to a camera center point of an input viewpoint and a direction from the point of the warped pixel in the three-dimensional space to a camera center point of a virtual viewpoint. A virtual viewpoint image synthesis device may assign a large blending weight to an object with a small angle. In such a case as the embodiment of FIG. 4, $\theta_1$ is larger than $\theta_2$. ($\theta_1 > \theta_2$). In this case, there is a problem that a larger weight is assigned to the object B, which is to be unseen by being occluded by the object A.

According to another embodiment, a weight of a pixel may be determined to be inversely proportional to a distance between a straight line, which is defined by a point of a warped pixel in a three-dimensional space and a camera center point of a virtual viewpoint, and a camera center point of an input viewpoint. In such a case as the embodiment of FIG. 4, $p_1$ is equal to $p_2$ ($p_1=p_2$). In this case, a same weight is determined for a pixel of the object A and a pixel of the object B. Accordingly, the pixel of the object A does not have a larger weight.

On the other hand, according to the present disclosure, when a weight of a pixel is determined to be inversely proportional to an area of a region defined by 3 points, P, C and V, the weight of the object A may be determined to be larger than the weight of the object B. Accordingly, a virtual viewpoint image synthesis device may determine weights of pixels of objects according to intention of virtual viewpoint image synthesis.

According to the present disclosure, a virtual viewpoint image synthesis device may determine a blending weight based on "triangle quality-based weight" $w_{tri}$ and "ray-based weight" $w_{ray}$ by using a weight model. Herein, the weight model may be a model that adjusts an application ratio and intensity of a blending ray-based weight according to a rig structure of a camera and/or a feature of a scene.

First, $F_{ray}$ is defined as a function that regularizes a tendency to be inversely proportional to an area of a region, which is defined by 3 points, P, C and V, to a value of 0 to 1. In addition, a virtual viewpoint image synthesis device determines a ray-based weight $w_{ray}$ based on a regularization function $F_{ray}$ according to Equation 4 and reflects the determined ray-based weight $w_{ray}$ in a blending weight.

$$w_{ray}=(1-\lambda)+\lambda \cdot F_{ray}^\alpha \quad \text{[Equation 4]}$$

Here, an embodiment of $F_{ray}$ may be the same as defined in Equation 5.

$$F_{ray} = \frac{1}{e^{b \cdot Area_{ray}}} \quad \text{[Equation 5]}$$

Here, b indicates a distance (baseline) between a camera center point of an input viewpoint camera and a camera center point of a virtual viewpoint, which is illustrated in FIG. 3. Area$_{ray}$ indicates an area of a region defined by the 3 points, P, C and V in FIG. 3. As b and Area$_{ray}$ have a smaller value, the value of tendency determined by Equation 5 approaches to 1. On the other hand, as b and Area$_{ray}$ have a larger value, the value of tendency approaches to 0.

$\lambda$ of Equation 4 indicates a parameter having a value of 0 to 1. In the case of $\lambda=1$, $w_{ray}$ is equal to $F_{ray}^\alpha$ ($w_{ray}=F_{ray}^\alpha$). Accordingly, in Equation 3, the impact of the ray-based weight is maximized. On the other hand, in the case of $\lambda=0$, $w_{ray}$ becomes 1 ($w_{ray}=1$). Accordingly, the ray-based weight is not reflected, and the blending weight is determined to be equal to the triangle quality-based weight. $\alpha$ indicates a parameter that adjusts the change intensity (or speed) of $F_{ray}^\alpha$. As $\alpha$ has a larger value, the width of $F_{ray}^\alpha$ graph drastically decreases, and as a has a smaller value, the width of $F_{ray}^\alpha$ graph gradually decreases.

According to the embodiment described above, two input viewpoint images and two objects were used for description, but the number of input viewpoint images and the number of objects are not limited to the embodiment, and two or more input viewpoint images and two or more objects may be applied in the same way.

Figure 5:
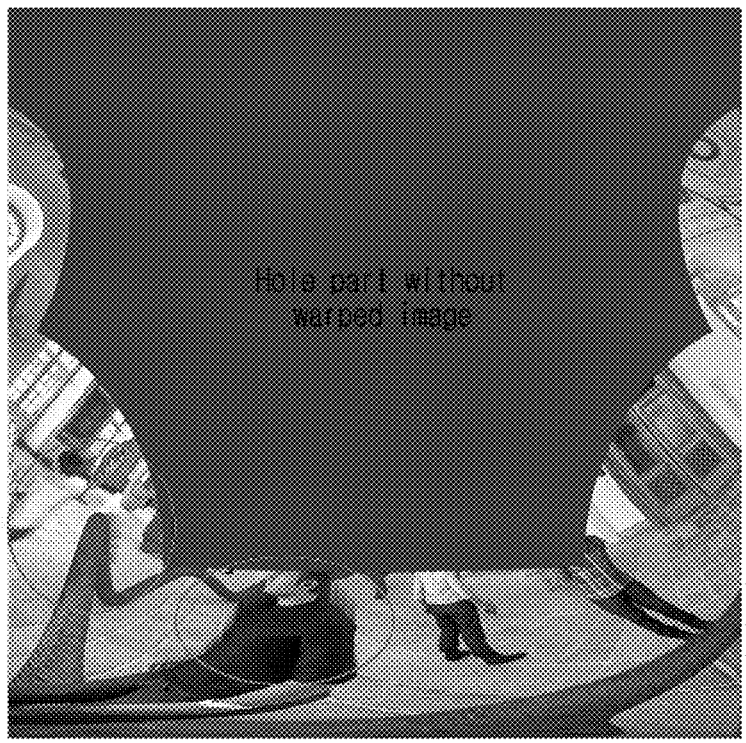
FIG. 5 illustrates an image synthesis result based on a ratio and intensity of a ray-based weight.

FIG. 5 illustrates an image synthesis result based on a ratio and intensity of a ray-based weight.

Referring to FIG. 5, a result of synthesizing by selectively warping some regions with a large ray-based weight is illustrated in FIG. 5. An image synthesis method of the present disclosure is based on an image synthesis method that, when a plane of a low-quality triangle unit occurs in synthesizing a plurality of warping image, blends high-quality pixels with a large weight, which are warped in a different viewpoint and removes a plane of a stretched triangle unit.

In case a ray-based weight is applied without limitation, a stretched triangle in a region with a large ray-based weight, as shown in FIG. 5, may be blended with a very small ray-based weight of a corresponding region in a neighboring input viewpoint.

The phenomenon illustrated in FIG. 5 occurs due to a structure of a camera rig or a feature of a scene. Accordingly, in the present disclosure, a virtual viewpoint image synthesis device may adjust a ratio of a ray-based weight by using $\lambda$ and adjust the impact of the ray-based weight by using $\alpha$.

FIG. 6 illustrates an image synthesis method based on a blending weight.

Referring to FIG. 6, a virtual viewpoint image synthesis device may synthesize a virtual viewpoint image based on a blending weight. Herein, the virtual viewpoint image synthesis device may include: a projection unit (projector) configured to warp a viewpoint image of an input viewpoint into a virtual viewpoint by using depth information of the input viewpoint; a blending unit (blender) configured to blend warped viewpoint images according to a blending weight for pixels of the warped viewpoint images; and a synthesizing unit (synthesizer) configured to synthesize an image of a virtual viewpoint based on the blended viewpoint images.

In the step S601, the virtual viewpoint image synthesis device may warp different viewpoint images into a virtual viewpoint by using depth information of an input viewpoint. Herein, the different viewpoint images may include two or more viewpoint images. Herein, the virtual viewpoint image synthesis device may warp a viewpoint image in a triangle unit, which is defined by 3 pixels adjacent to a pixel of the viewpoint image.

In the step S603, the virtual viewpoint image synthesis device may determine a first weight for pixels based on the quality and depth of the pixels of the warped viewpoint images. Herein, the first weight may be a triangle quality-based weight.

A quality value of a pixel of warped images may be determined to be inversely proportional to a length of the longest side of a triangle unit corresponding to a pixel of a viewpoint image. In addition, a depth value of a pixel of warped images may be determined by interpolating a depth value of 3 pixels of a triangle unit corresponding to a pixel of a viewpoint image.

In the step S605, the virtual viewpoint image synthesis device may determine a second weight for pixels based on a location relation between the pixels of the warped viewpoint images and a virtual viewpoint. Herein, the second weight may be a ray-based weight that is determined based on an area of a region defined by a first point of a pixel in a three-dimensional space according to depth information of the pixel, a second point indicating a camera center of an input viewpoint, and a third point indicating a camera center of a virtual viewpoint.

The second weight may be determined based on at least one of a rig structure of a camera and a feature of an image. The second weight may be determined to be inversely proportional to an area defined by the first point to the third point. Alternatively, the second weight may be determined to be inversely proportional to a product of the area defined by the first point to the third point and a distance between the second point and the third point.

In the step S607, the virtual viewpoint image synthesis device may determine a blending weight for pixels based on the first weight and the second weight for pixels.

In the step S609, the virtual viewpoint image synthesis device may determine may blend warped viewpoint images according to the blending weight of pixels. Based on a blending weight of different pixels, the virtual viewpoint image synthesis device may blend a viewpoint image by using a color value of one of the different pixels. An operation of the virtual viewpoint image synthesis device, which blends the viewpoint image based on the blending weight of the different pixels, may be described as follows. According to an embodiment, when different pixels included in different warped viewpoint images have a same location, the virtual viewpoint image synthesis device may perform weighted-blending of the different pixels by reflecting a blending weight of each of the different pixels. Herein, the different pixels may include two or more pixels. In addition, when blending a viewpoint image, the virtual viewpoint image synthesis device may use a color value of a weight-blended pixel.

In the step S611, the virtual viewpoint image synthesis device may synthesize an image of a virtual viewpoint based on the blended viewpoint images. When a hole occurs in the synthesized virtual viewpoint image, the virtual viewpoint image synthesis device may inpaint the hole part of the synthesized virtual viewpoint image and finally synthesize the virtual viewpoint image.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method for synthesizing a virtual viewpoint image, the method comprising:
    warping viewpoint images of different input viewpoints into a virtual viewpoint by using depth information of the different input viewpoints;
    determining first weights for pixels based on quality and depth of the pixels of the warped viewpoint images;
    determining second weights for the pixels based on a location relation between the pixels of the warped viewpoint images and the virtual viewpoint;
    determining blending weights for the pixels based on the first weights and the second weights;
    blending the warped viewpoint images according to the blending weights; and
    synthesizing the virtual viewpoint image based on the blended viewpoint images,
    wherein a second weight for a pixel is determined based on an area of a region that is defined by a first point of the pixel in a three-dimensional space according to depth information of the pixel, a second point indicating a camera center of an input viewpoint, and a third point indicating a camera center of the virtual viewpoint.

2. The method of claim 1, wherein the warping of the viewpoint images of the different input viewpoints into the virtual viewpoint comprises warping the viewpoint images of the different input viewpoints in a triangle unit that is defined by 3 pixels adjacent to a pixel of the viewpoint images.

3. The method of claim 2, wherein a quality value of a pixel of the warped viewpoint images is inversely proportional to a length of a longest side of the triangle unit corresponding to the pixel of the viewpoint images.

4. The method of claim 2, wherein a depth value of a pixel of the warped viewpoint images is determined by interpolating depth values of the 3 pixels of the triangle unit corresponding to the pixel of the viewpoint images.

5. The method of claim 1, wherein the second weight is determined to be inversely proportional to the area of the region.

6. The method of claim 1, wherein the second weight is determined to be inversely proportional to a product of the area of the region and a distance between the second point and the third point.

7. The method of claim 1, wherein each of the second weights is determined based on at least one of a rig structure of a camera and a feature of a viewpoint image.

8. The method of claim 1, wherein, when different pixels of the warped viewpoint images have a same location, the blending of the warped viewpoint images comprises using a color value, which is weight-blended based on blending weights of the different pixels, to blend the warped viewpoint images.

9. The method of claim 1, further comprising:
inpainting a hole part of the synthesized virtual viewpoint image.

10. An apparatus for synthesizing a virtual viewpoint image, the apparatus comprising:
a projector configured to warp viewpoint images of different input viewpoints into a virtual viewpoint by using depth information of the different input viewpoints;
a blender configured to blend the warped viewpoint images according to blending weights for pixels of the warped viewpoint images; and
a synthesizer configured to synthesize the virtual viewpoint image based on the blended viewpoint images,
wherein the blending weights are determined based on first weights for pixels of the warped viewpoint images, which are determined based on quality and depth of the pixels, and second weights for the pixels of the warped viewpoint images, which are determined based on a location relation between the pixels and the virtual viewpoint, and
wherein a second weight for a pixel is determined based on an area of a region that is defined by a first point of the pixel in a three-dimensional space according to depth information of the pixel, a second point indicating a camera center of an input viewpoint, and a third point indicating a camera center of the virtual viewpoint.

11. The apparatus of claim 10, wherein the projector is further configured to warp the viewpoint images of the different input viewpoints in a triangle unit that is defined by 3 pixels adjacent to a pixel of the viewpoint images.

12. The apparatus of claim 11, wherein a quality value of a pixel of the warped viewpoint images is inversely proportional to a length of a longest side of the triangle unit corresponding to the pixel of the viewpoint images.

13. The apparatus of claim 11, wherein a depth value of a pixel of the warped viewpoint images is determined by interpolating depth values of the 3 pixels of the triangle unit corresponding to the pixel of the viewpoint images.

14. The apparatus of claim 10, wherein the second weight is determined to be inversely proportional to the area of the region.

15. The apparatus of claim 10, wherein the second weight is determined to be inversely proportional to a product of the area of the region and a distance between the second point and the third point.

16. The apparatus of claim 10, wherein each of the second weights is determined based on at least one of a rig structure of a camera and a feature of a viewpoint image.

17. The apparatus of claim 10, wherein, when different pixels of the warped viewpoint images have a same location, the blender is further configured to use a color value, which is weight-blended based on blending weights of the different pixels, to blend the warped viewpoint images.

18. A non-transitory computer-readable medium having stored thereon computer-executable instructions, which, when executed by a processor, performs a virtual viewpoint image synthesis method that comprises:
warping viewpoint images of different input viewpoints into a virtual viewpoint by using depth information of the input viewpoints;
based on quality and depth of pixels of the warped viewpoint images, determining first weights for the pixels;
based on a location relation between the pixels of the warped viewpoint images and the virtual viewpoint, determining second weights for the pixels;
based on the first weights and the second weights, determining blending weights for the pixels;
blending the warped viewpoint images according to the blending weights; and
based on the blended viewpoint images, synthesizing the virtual viewpoint image,
wherein a second weight for a pixel is determined based on an area of a region that is defined by a first point of the pixel in a three-dimensional space according to depth information of the pixel, a second point indicating a camera center of an input viewpoint, and a third point indicating a camera center of the virtual viewpoint.

* * * * *